(12) United States Patent
Sedlmayr et al.

(10) Patent No.: US 12,394,856 B2
(45) Date of Patent: Aug. 19, 2025

(54) CENTERING FOR A CELL CONNECTOR IN A BATTERY MODULE

(71) Applicant: instagrid GmbH, Ludwigsburg (DE)

(72) Inventors: Andreas Sedlmayr, Pforzheim (DE); Sebastian Berning, Stuttgart (DE)

(73) Assignee: instagrid GmbH, Ludwigsburg (DE)

( * ) Notice: Subject to any disclaimer, the term of this patent is extended or adjusted under 35 U.S.C. 154(b) by 686 days.

(21) Appl. No.: 17/726,154

(22) Filed: Apr. 21, 2022

(65) Prior Publication Data

US 2022/0247030 A1 Aug. 4, 2022

Related U.S. Application Data

(63) Continuation of application No. PCT/EP2020/079602, filed on Oct. 21, 2020.

(30) Foreign Application Priority Data

Oct. 21, 2019 (DE) .................... 10 2019 128 396.5

(51) Int. Cl.
*H01M 50/291* (2021.01)
*H01M 50/213* (2021.01)
(Continued)

(52) U.S. Cl.
CPC ....... *H01M 50/291* (2021.01); *H01M 50/213* (2021.01); *H01M 50/238* (2021.01); *H01M 50/244* (2021.01); *H01M 50/284* (2021.01); *H01M 50/293* (2021.01); *H01M 50/503* (2021.01); *H01M 50/519* (2021.01)

(58) Field of Classification Search
CPC ..... H01M 50/204; H01M 50/207–211; H01M 50/213; H01M 50/233; H01M 50/238; H01M 50/242; H01M 50/284; H01M 50/287; H01M 50/289; H01M 50/291; H01M 50/293
See application file for complete search history.

(56) References Cited

U.S. PATENT DOCUMENTS 6,724,170 B1 4/2004 Maggert et al.
2004/0265687 A1 12/2004 Chan et al.
(Continued)

FOREIGN PATENT DOCUMENTS

EP 3460878 A1 3/2019
WO WO2013073179 A2 5/2013

OTHER PUBLICATIONS

International Search Report and Written Opinion issued for PCT/EP2020/079602 on Jan. 28, 2021; 5 pages.
(Continued)

*Primary Examiner* — Jeremiah R Smith
(74) *Attorney, Agent, or Firm* — The Webb Law Firm

(57) ABSTRACT

A battery module housing for receiving multiple battery cells having: multiple receiving regions for the battery cells, battery cell receiving regions, a receiving region for a circuit board, circuit board receiving region that lies adjacent to the battery cells receiving regions; and multiple receiving regions for cell connectors, cell connector receiving regions that are provided adjacent to some of the battery cell receiving regions. At least one centering unit is provided for a cell connector within at least one of the cell connector receiving regions.

21 Claims, 3 Drawing Sheets

(51) Int. Cl.
     *H01M 50/238*    (2021.01)
     *H01M 50/244*    (2021.01)
     *H01M 50/284*    (2021.01)
     *H01M 50/293*    (2021.01)
     *H01M 50/503*    (2021.01)
     *H01M 50/519*    (2021.01)

(56) References Cited

U.S. PATENT DOCUMENTS

| | | | |
|---|---|---|---|
| 2009/0111015 A1* | 4/2009 | Wood | H01M 50/291 |
| | | | 429/164 |
| 2010/0055993 A1 | 3/2010 | Ikeda et al. | |
| 2012/0258335 A1* | 10/2012 | Bae | H01M 10/425 |
| | | | 429/7 |
| 2014/0004392 A1 | 1/2014 | Sung et al. | |
| 2015/0037626 A1 | 2/2015 | Malcolm et al. | |
| 2015/0104675 A1 | 4/2015 | Mishiro et al. | |
| 2019/0097190 A1* | 3/2019 | Seol | H01M 50/503 |
| 2019/0135207 A1 | 5/2019 | Sumida | |
| 2020/0381682 A1* | 12/2020 | Haino | H01M 50/284 |
| 2022/0045397 A1* | 2/2022 | Nakamura | H01M 50/505 |

OTHER PUBLICATIONS

Search Report Issued by the German Patent Office for application 10 2019 128 396.5 on Feb. 4, 2021; 6 pages.
English Translation of the International Preliminary Report on Patentability issued for PCT/EP2020/079602 on Apr. 22, 2022; 7 pages.

\* cited by examiner

CENTERING FOR A CELL CONNECTOR IN A BATTERY MODULE

CROSS REFERENCES TO RELATED APPLICATIONS

This application is a continuation of international patent application PCT/EP2020/079602 filed on Oct. 21, 2020 and published in the German language as WO 2021/078788 A1, the international patent application claims priority from German patent application DE 10 2019 128 396 filed on Oct. 21, 2019.

BACKGROUND

The present application relates to a battery module housing for receiving multiple battery cells, having multiple receiving regions for the battery cells (also referred to as battery cell receiving regions), a receiving region for a circuit board (also referred to as a circuit board receiving region), which lies adjacent to the battery cell receiving regions, and multiple receiving regions for cell connectors (also referred to as cell connector receiving regions), which are provided adjacent to some of the battery cell receiving regions.

Rechargeable batteries (power packs), which are referred to below as batteries, have for decades been an integral component of systems that are to be supplied with energy far away from the power grid. The market penetration of batteries has significantly increased over the last decade on account of the use of lithium ion cell technology and such batteries being produced in standardized forms in high volumes.

Thus, markets currently exist, such as electric tools, in which battery operated devices have meanwhile assumed a prominent position. By virtue of ever reducing costs, battery solutions have found their way into many further markets in recent years, for example in the case of electric bicycles and vacuum cleaners.

In order to render it possible to supply the battery for a special application, individual battery cells are operated in a series connection and a parallel connection or in a combination of the two. For this purpose, the individual battery cells are connected to one another in the corresponding arrangement by way of electrically conductive units, such as for example sheet metal, in order to provide the corresponding voltage and capacity. Usually, these multiple battery cells that are connected to one another are accommodated in a housing, in order to form a compact unit that can be handled in a simple manner and is also referred to as a battery pack or battery module.

The safe and reliable operation of lithium ion batteries places some demands on the design of a battery module. It is thus necessary for example to constantly monitor each lithium iron cell and to undertake measures if a cell is outside a defined operating range, such as for example current, voltage, temperature. Electronic circuits, so-called battery management systems (BMS) are used for monitoring and control purposes. In order for such systems to be able to carry out the monitoring, they must be connected to the battery cells, referred to below in short as cells, or in other cases said battery management systems must have sensors that are connected to the cells or can monitor the cells from a distance, for example by means of temperature sensors.

For the purpose of measuring the current and voltage, the cells are electrically conductively connected to the electronic circuit that then by way of corresponding components, for example shunts or ICs, measures the parameters and evaluates the parameters and or transmits said parameters to another site for evaluation. The electrically conductive connection is nowadays mainly produced by means of a combination of stamped bent parts and/or cables by soldering or welding.

It is essential for the operation of a battery of an electrically operated system to produce and maintain a safe and reliable connection between the individual battery cells. If a connection fails, then the entire system is switched off or there is the risk that a cell is operated outside its limits and thus fails or transitions into an unsafe state. In addition, in the event of a loose connection there is the risk that an undesired electrical connection to another conductive part occurs and as a consequence the battery is short-circuited, which can lead to failure and even to thermal decomposition of the battery.

In addition, high demand is placed on the manufacturability of battery modules in order to realize cost advantages in the case of high volumes.

The currently available connections by way of cables have the disadvantage that it is not possible to manufacture them in repeatable orientation owing to their flexibility and as a consequence it is not possible to position them clearly and precisely. It is therefore necessary to connect them manually at both ends.

A further disadvantage of the flexibility of cables is the high probability for an undesired connection to other critical sites in the event of a loose connection site.

By making the connection only by way of a stamped bent part, the advantage is created here that by virtue of a further bend it is possible to forego one connection and thus it is only necessary to make a connection of the cell to the electronic system. Also, the greater bend resistance renders possible a longer tolerance field in the production process and thus a greater degree of automation or a higher repetition frequency in the production process. Also, the probability of an incorrect connection in the event of a loose connection is thereby greatly reduced.

However, as a result of existing manufacturing tolerances, there still exists, even in the case of stamped bent parts and other connections that have a better bend resistance than cable, the disadvantage that parts must still always be inserted manually or reworked manually, because above all in the case of unfavorable aspect ratios small tolerances result in large deviations and not only is it not possible to supply parts and produce the connection in an automated manner but rather problems with positioning frequently occur in the manual production process when it is necessary to connect two or multiple cell connectors to an electronic system, which is the case in each battery module.

This can be particularly critical if the length of the connection between the cell and the electronic system is greater than the diameter of the cell being used.

SUMMARY

On the basis of this background, an object of the present application is to develop a battery module housing for receiving multiple battery cells of the type mentioned in the introduction in such a manner that the described disadvantages can be overcome. In particular, an object is to simplify the production process with the result that also an automated production process is possible without having to accept any loss of safety.

This object may be achieved by the battery module housing that is mentioned in the introduction by virtue of the fact that at least one centering unit is provided for a cell connector within at least one of the cell connector receiving regions.

As previously already mentioned, a so-called cell connector is used to connect the terminals of two cells. It is possible in this manner to connect multiple cells in parallel or in series to one another in order to provide a battery module. It is necessary in order to monitor the cells within the battery module by way of a battery management system, to connect both terminals to the battery management system. For this purpose, the cell connector has a section that produces an electrical connection between the terminal and a circuit board that usually supports the battery management system. The section of the cell connector usually extends for this purpose over the entire length of a cell before it passes into a contacting opening or into a contact element of the circuit board in order to produce the electrical connection.

The centering unit in accordance with the application now ensures that the mentioned section of the cell connector can be readily positioned into the opening or into the contact element of the circuit board without an incorrect positioning occurring. Thus, it is possible inter alia to also compensate manufacturing tolerances in the case of the cell connector.

It is now possible using the centering unit in accordance with the application to install the cell connector in an automated manner without there being the risk of an incorrect positioning with regard to the circuit board, in particular with regard to the opening in the circuit board or in the contact element.

Furthermore, the cell connector can be produced in a cost-effective manner as a stamped bent part from a conductive material with the result that for example it is possible to forego a cable connection between the terminals and the circuit board.

An object of the present application is thereby completely achieved.

In the case of a preferred embodiment, the centering unit is fixedly connected to the battery module housing, preferably an integral component of the battery module housing.

This has the advantage that an extremely cost-effective production process is possible.

In the case of a preferred embodiment, the centering unit can be inserted into the cell connector receiving region.

This means in other words that the centering unit is not fixedly connected to the battery module housing but rather can be inserted after the battery module housing has been produced.

The advantage of this solution is that it is possible to realize a high degree of flexibility. Thus, it is possible to provide for example different centering units that are tailored to suit different cell connectors or different receiving devices or contact elements on the circuit board.

In a preferred embodiment, the centering unit has at least two, preferably four centering elements, which are arranged in such a manner that they define between themselves an opening cross section through which a section of the cell connector can be pushed.

The advantage of this measure is that the accuracy of the positioning when using multiple centering elements can be increased.

In a preferred embodiment, the centering elements of the centering unit are arranged in such a manner that the opening cross-section reduces in the insertion direction in order to guide and center the cell connector.

The advantage of this measure is that the cell connector is guided into the centered position by the centering elements during the insertion procedure with the result that is possible to avoid any entanglement etc. between the cell connector and the centering element.

In a preferred embodiment, the opening cross-section at the beginning—when viewed in the insertion direction—is at least 50% greater than the cross-section of the section of the cell connector that is to be guided through it.

This ratio has proven to be particularly advantageous.

In the case of a preferred embodiment, the centering elements are designed as flexible tabs.

The advantage of this measure is that the flexibility of the tabs allows greater compensation with regard to manufacturing tolerances.

In the case of a preferred embodiment, the opening cross-section can be adjusted.

This measure has the advantage that by virtue of the adjustability of the opening cross-section, it is possible to realize a greater degree of flexibility with respect to the design of the respective cell connector.

In the case of a preferred embodiment, the battery cell receiving regions are delimited by at least in part cylindrical walls in such a manner that cylindrical battery cells are held in a defined manner in the battery cells receiving regions. It is preferred that the centering unit is fixed to at least one wall of a battery cell receiving region, preferably to walls of two battery cell receiving regions.

This measure has also proven to be particularly advantageous since it renders possible on the one hand a simple production process and on the other hand an effective positioning possibility also of the battery cells within the battery module housing.

In the case of a preferred embodiment, a circuit board is held in the circuit board receiving region, wherein the circuit board has openings for cell connectors and the openings and the centering units are oriented with respect to one another with the result that the cell connectors are guided into the openings by means of the centering units during the insertion procedure.

This measure has likewise proven to be particularly advantageous.

In the case of a preferred embodiment, a cell connector has a terminal connector section and a connection section (e.g., connection strip section), wherein the terminal connector section connects at least two battery cell terminals and the connection strip section passes through the cell connector receiving region and produces a connection to the circuit board.

This measure has the advantage that the cell connector can be produced in a cost-effective manner as a stamped bent part. It is preferred that the cell connector is produced as a stamped and bent part from sheet metal. However, it would also be feasible to produce the terminal connector section and the connection strip section separately from one another, for example by means of stamping and bending and then subsequently to join the two parts together in a bonded or positive-locking manner, for example by means of laser welding or spot welding.

In the case of a preferred embodiment, an outer housing is provided that has an attachable upper and lower housing part and a closed wall part, wherein the lower housing part is formed at least section by section, preferably completely, by the circuit board.

This measure has the advantage that it is possible to forego one component, namely an attachable lower housing part, since the circuit board forms the lower housing part and consequently closes the lower opening region that is formed by the closed wall part.

In the case of a preferred embodiment, the walls of the battery cell receiving regions are attached to the wall part.

In the case of a preferred embodiment, the battery module housing is produced from a synthetic material, preferably by means of injection molding.

This measure has the advantage that a very cost-effective housing is possible.

In the case of a preferred embodiment, the length of the battery cell receiving region is greater than its diameter.

In the case of such dimensions, the advantage of the centering unit in accordance with the application is particularly great since the risk of incorrect positioning as a result of the long length of the connection piece section of the cell connector in comparison to its width is increased.

It is clear that the above mentioned features and the features that are still to be explained below can be used not only in the respective disclosed combination but can also be used in other combinations or as standalone without departing from the scope of the present invention.

BRIEF DESCRIPTION OF THE FIGURES

Further advantages and embodiments of the application are disclosed in the description and attached drawings. In the drawings.

DESCRIPTION OF PREFERRED EMBODIMENTS

Figure 1:
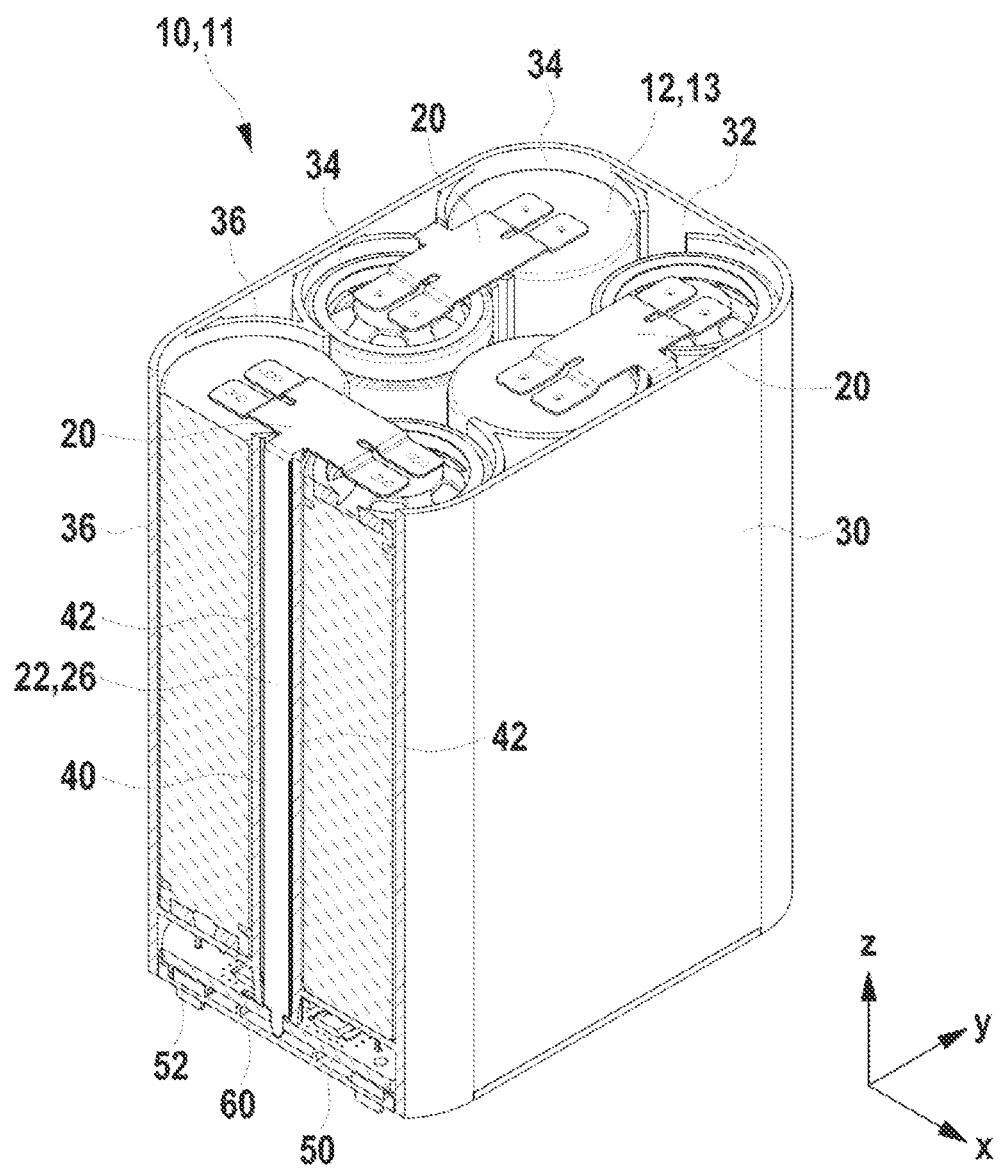
FIG. 1 illustrates a schematic perspective view of a battery module housing with installed battery cells, cell connector and circuit board.

FIG. 1 illustrates a battery module housing in a schematic perspective view and designated by the reference numeral 10. In order to better explain the elements that are provided in the battery module housing, the upper side of the battery module housing is open and a further region is illustrates as a sectional view.

The battery module housing 10 holds multiple battery cells 12, in the present exemplary embodiment in total six battery cells that are provided in a uniformly distributed manner in the interior space of the battery module housing.

The battery cells 12 are for example rechargeable lithium ion batteries 13 that have a cylindrical construction with a length that is considerably greater than its diameter. In the example illustrated in FIG. 1, the battery cells 12 are installed in the battery module housing 10 in such a manner that the longitudinal axis of the battery cells runs in the z direction (in the figure in the vertical direction).

The terminals of the battery cells 12 lie at the respective longitudinal ends and are usually electrically connected to one another so as to connect the battery cells. The manner in which the terminals are electrically connected depends in this case on the desired initial voltage and power, wherein within the scope of the present application the manner in which the individual battery cells are connected to one another is of no importance.

In order to electrically connect individual battery cells 12 to one another, so-called cell connectors 20 are used which are small plates that are produced from a conductive material using a stamping and bending technique. As is clearly apparent in FIG. 1, in total three cell connectors 20 are provided, wherein each cell connector 20 or a positive terminal is connected to a minus terminal of adjacent battery cells. Corresponding further cell connectors are provided on the lower side of the battery cells 12 but these are not illustrated.

Figure 3:
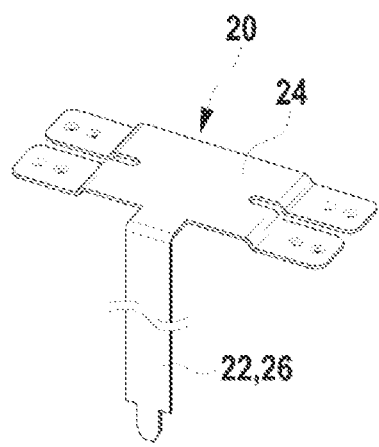
FIG. 3 illustrates a schematic perspective view of a cell connector.

On the side of the battery module housing 10 that is illustrated in a cut-open manner in FIG. 1, it is clearly apparent that a section 22 that extends in a z direction leads off from the section of the cell connector 20 that lies in an x-y plane and the section 22 extends over the entire length of the battery cell 12. The cell connector 20 is divided as follows, as is also schematically illustrated in FIG. 3, into a first section, which is described as a terminal connector section 24, and a section 22, which is described as a connection strip section 26. The terminal connector section and the connection strip section lie in planes that are perpendicular with respect to one another.

The battery module housing 10 itself has side walls 30 that encompass an interior space 32. Battery cells receiving regions 34 are provided in this interior space 32 and said battery cells receiving regions are used to hold the battery cells 12 in defined positions. The battery cells receiving regions 34 are delimited in this case by wall elements 36. In the exemplary embodiment that is illustrated in FIG. 1, each battery cell 12 is arranged in a battery cells receiving region 34 that in turn is delimited by at least one wall element 36. The wall element 36 that is allocated to a battery cells receiving region has an at least in part cylindrical shape and preferably extends over the entire length of the battery cell 12. The wall elements 36 are in turn attached to the inner side of the side walls 30. The wall elements 36 consequently render it possible to install the battery cells 12 in a precise position over the upper side the battery cells receiving region 10.

It is further apparent in FIG. 1 that the connection strip section 26 of the cell connector 20 extends in a perpendicular manner, in other words in the Z direction, through a cell connector receiving region 40, wherein this cell connector receiving region 40 is delimited at least in part by wall elements 42. These wall elements 42 preferably extend likewise over the entire length of a battery cell 12, wherein the wall element 36 can also assume the function of the wall element 42 so as to delimit the battery cells receiving regions 34. In other words, the wall elements 36, 42 can delimit both a battery cells receiving region 34 and also a cell connector receiving region 40. The embodiment that is illustrated in FIG. 1 of a battery module housing 10 comprises in total six battery cells receiving regions 34 and three cell connector receiving regions 40.

Finally, the battery module housing 10 also has a circuit board receiving region 50 that is provided on the lower end (as seen in the z direction) of the battery module housing 10 and lies below the installed battery cells 12. It is possible to install in this circuit board receiving region 50 a circuit board 52 that in the present exemplary embodiment covers the entire lower opening region which is formed by the side walls 30.

The circuit board 52 has the electronic system necessary for the battery management and in addition provides the connections for tapping the output voltage of the battery cells 12 that are connected in a row or in series to one another.

As previously already mentioned, the connection strip section 26 of each cell connector 20 carries a voltage signal downwards into the circuit board receiving region 50 and finally to the circuit board 52 and the battery management system.

The connection of the connection strip section 26 to the circuit board 52 is performed in a simple manner by virtue of the fact that the circuit board 52 has a corresponding opening for receiving the connection strip section. As the connection strip section 26 is inserted into the corresponding opening of the circuit board 52, it contacts the corresponding conductor tracks in an electrical manner with the result that the signal of the upper lying terminal of the respective battery cells can be evaluated by the electronic system on the circuit board and can be made available.

After the battery cells 12 and the cell connector 20 have been installed from above through a top cover, which is not illustrated in FIG. 1 for the sake of clarity, the battery module housing 10 is closed with the result that overall it is possible to provide a closed battery module 11 that is easy to handle.

Figure 2:
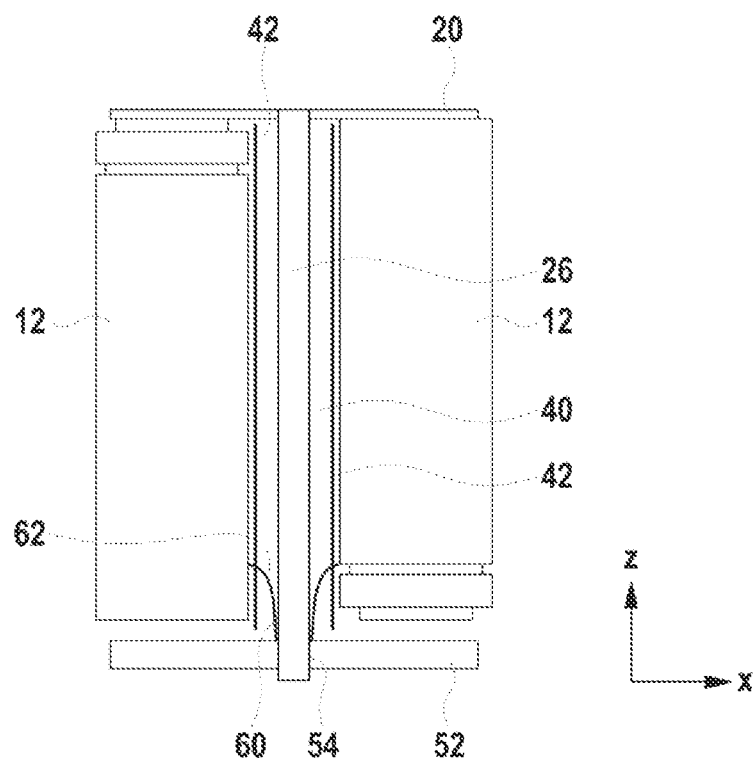
FIG. 2 illustrates a schematic view of a region of the battery module housing for explaining the arrangement of a cell connector.

In order to explain the construction, FIG. 2 illustrates two battery cells 12 that are arranged adjacent to one another and whose upper lying terminals are connected to one another by way of the cell connector 20.

The circuit board 52 is provided below the two battery cells 12 and said circuit board has the necessary electronic system for a battery management system.

Moreover, two wall elements 42 are also illustrated schematically and in the illustrated side view said two wall elements delimit the cell connector receiving region 40.

The connection strip section 26 of the cell connector 20 extends in this cell connector receiving region 40, wherein the lower longitudinal end section of the connection strip section 26 is received in an opening 54 in the circuit board 52, preferably completely penetrates the opening 54. It is possible in this manner to produce an electrical connection between the upper terminals of the two battery cells 12 to the circuit board 52 and consequently to the electronic system provided thereon.

When assembling the battery module 11, in particular when inserting the cell connector 20, a positioning problem occurs as a result of the very large length/width ratio of the connection strip section 26. This means in other words that the connection strip section 26 cannot be readily inserted into the opening 24. This difficulty that is further increased as a result of usual manufacturing tolerances generally prevents the cell connector 20 being inserted and positioned in an automated manner.

In order to overcome this problem, a centering unit 60 is provided within the cell connector receiving region 40. This centering unit 60 has the task of guiding the connection strip section 26 during the insertion procedure and to orient it precisely with respect to the opening 54, with the result that the connection strip section 26 finds the opening 54 in the circuit board without becoming entangled etc. The centering unit 60 is designed for this purpose in such a manner that it reduces the opening cross-section of the cell connector receiving region 40 downwards in the z direction, wherein the lower smallest opening cross-section of the centering unit 60 corresponds approximately to the cross-section of the connection strip section 26. It is particularly preferred that the opening cross-section at the upper end of the centering unit 60 is at least 50% greater than the cross-section of the connection strip section 26 that is to be guided through it.

In order to realize the centering function of the centering unit 60, different possibilities are feasible, wherein three possibilities are explained below by way of example.

One possibility for designing the centering unit 60 is to provide multiple centering elements, preferably four centering elements 62, on the wall elements 42 that delimit the cell connector receiving region 40. These centering elements 62 can be designed as flexible (preferably in the x and y direction) tabs that are attached to the wall elements 42.

A second possibility is to change the shape of the wall elements 42 in the lower region so that they accordingly reduce the opening cross-section with the result that this opening that is formed by the wall elements 42 is oriented precisely with respect to the opening in the circuit board 52.

Furthermore, it goes without saying that is it is also feasible to provide a combination of the aforementioned two solutions, in other words on the one hand a wall element 42 that has a changed shape and on the other hand a flexible centering element 62 that lies opposite for example and is provided on the corresponding wall element 42.

The aforementioned solutions have in common that they are a fixed component of the battery module housing 10.

Figure 5:
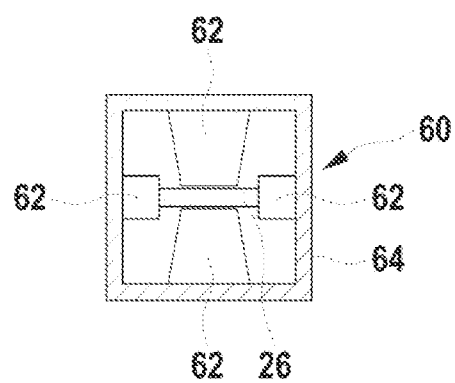
FIG. 5 illustrates a schematic sectional view of a centering unit from above.

In a third solution, the centering unit 60 can now be designed as a separate element that can be installed as required in the cell connector receiving region 40. Such a centering unit 60 is illustrated by way of example in FIG. 5. Merely by way of example, the centering unit 60 has a rectangular frame 64 on which are preferably attached four centering elements 62 that guide and center the connection strip section 26.

Figure 4:
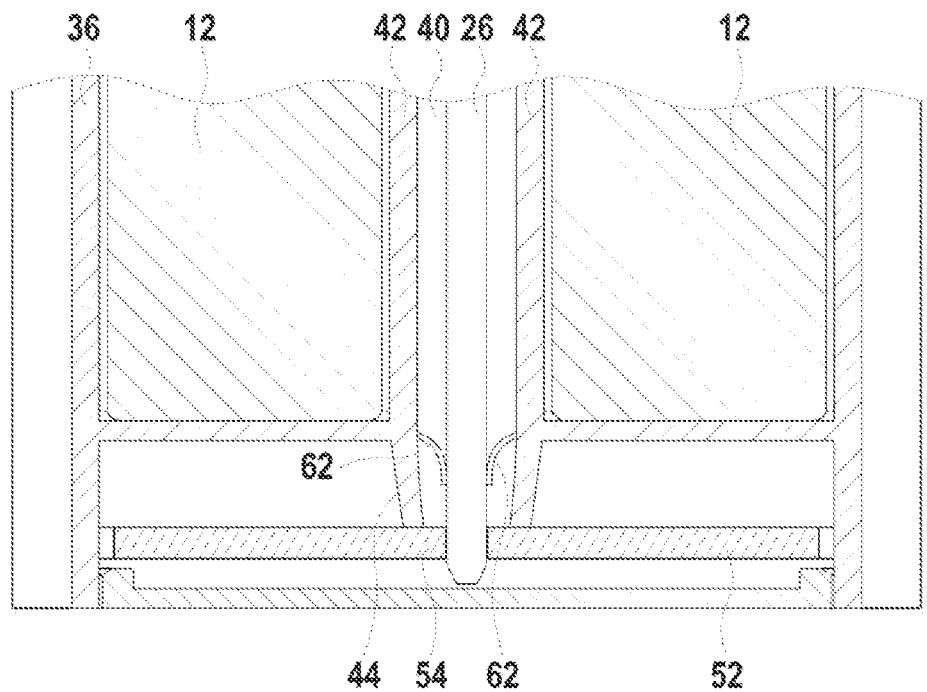
FIG. 4 illustrates a schematic detailed view of a lower region of the battery module housing so as to explain the centering unit.

FIG. 4 also illustrates in an enlarged view the lower region of the battery module housing 10. The centering unit 60 is clearly apparent with two centering elements 62 provided on the two wall elements 42. As previously mentioned, the lower sections 44 of the wall elements 42 are designed so that they reduce the opening cross-section in order to provide a centering function for the connection strip section 26.

In summary, it can therefore be stated that with the aid of the centering unit 60 it is possible to produce the battery module 11 in a clearly simplified manner. The cell connector 20 can be installed in an automated manner since the connection strip section 26 is reliably guided into the corresponding openings 54 of the circuit board 52 by means of the centering unit. Any entanglement is therefore avoided. It is also possible using the centering unit 60 to compensate manufacturing tolerances.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A battery module housing for receiving multiple battery cells, comprising:
a plurality of battery cell receiving regions,
a circuit board receiving region, wherein the circuit board receiving region lies adjacent to the battery cell receiving regions;
a plurality of cell connector receiving regions, wherein the cell connector receiving regions are provided adjacent to at least some of the plurality of battery cell receiving regions and each cell connector receiving region is an elongated cell connector receiving region adapted to receive an elongated connection section of a cell connector; and
at least one centering unit within at least one of the cell connector receiving regions, wherein the at least one centering unit is adapted to guide the elongated connection section of the cell connector received by the respective cell connector receiving region into contact with a circuit board positioned within the circuit board receiving region.

2. The battery module housing as claimed in claim 1, wherein the centering unit is fixedly connected to the battery module housing, or is an integral component of the battery module housing.

3. The battery module housing as claimed in claim 1, wherein the centering unit can be inserted in the cell connector receiving region.

4. The battery module housing as claimed in claim 1, wherein the centering unit has at least two centering elements that collectively define an opening cross-section, through which the connection section of the cell connector can be inserted.

5. The battery module housing as claimed in claim 4, wherein the centering elements are arranged in such a manner that the opening cross-section is reduced in an insertion direction of the connection section in order to guide and center the cell connector.

6. The battery module housing as claimed in claim 5, wherein the opening cross-section at the beginning, when viewed in the insertion direction, is at least 50% greater than the cross-section of the connection section that is to be guided through it.

7. The battery module housing as claimed in claim 5, wherein the centering elements are designed as tabs or flexible tabs.

8. The battery module housing as claimed in claim 4, wherein the opening cross-section can be adjusted.

9. The battery module housing as claimed in claim 1, wherein the battery cell receiving regions are delimited by at least in part cylindrical walls in such a manner that cylindrical battery cells are held in a defined manner in the battery cells receiving regions.

10. The battery module housing as claimed in claim 9, wherein the centering unit is fixed to at least one wall of a battery cell receiving region.

11. The battery module housing as claimed in claim 9, wherein the cylindrical walls of the battery cell receiving region are attached to a closed wall part of the housing.

12. The battery module housing as claimed in claim 1, wherein the centering unit is oriented with respect to the circuit board receiving region such that the centering unit is adapted to guide the connection section into at least one opening in a circuit board positioned within the circuit board receiving region.

13. The battery module housing as claimed in claim 1, wherein the cell connector has a terminal connector section, wherein the terminal connector section connects at least two battery cell terminals.

14. The battery module housing as claimed in claim 1, wherein an outer housing is provided which has an attachable upper and lower housing part and a closed wall part, wherein the lower housing part is formed by means of the circuit board.

15. The battery module housing as claimed in claim 14, wherein walls of the battery cell receiving region are attached to the closed wall part.

16. The battery module housing as claimed in claim 1, wherein the housing is produced from a synthetic material.

17. The battery module housing as claimed in claim 1, wherein the cell connector is a stamped bent part.

18. The battery module housing as claimed in claim 1, wherein the length of the battery cell receiving region is greater than its diameter.

19. A battery module housing for receiving multiple battery cells, comprising:
a plurality of battery cell receiving regions,
a circuit board receiving region, wherein the circuit board receiving region lies adjacent to the battery cell receiving regions;
a plurality of cell connector receiving regions, wherein the cell connector receiving regions are provided adjacent to at least some of the battery cell receiving regions; and
at least one centering unit within at least one of the cell connector receiving regions;
wherein the at least one centering unit has at least two centering elements that collectively define an opening cross-section through which a connection section of the cell connector can be pushed inserted in an insertion direction, the opening cross-section being reduced in the insertion direction in order to guide and center the cell connector, and wherein the centering elements are designed as flexible tabs.

20. A battery module, comprising:
a plurality of battery cell receiving regions each containing a battery cell;
a circuit board receiving region containing a circuit board, wherein the circuit board receiving region lies adjacent to the battery cell receiving regions;
a plurality of cell connectors, each comprising an elongated connection section;
a plurality of cell connector receiving regions, wherein the cell connector receiving regions are provided adjacent to at least some of the plurality of battery cell receiving regions and each cell connector receiving region is an elongated cell connector receiving region adapted to receive the elongated connection section of one of the plurality of cell connectors; and
at least one centering unit within at least one of the cell connector receiving regions, wherein the at least one centering unit is adapted to guide the elongated connection section of the cell connector received by the respective cell connector receiving region into contact with the circuit board.

21. The battery module as claimed in claim 20, wherein the circuit board has at least one opening for receiving the elongated connection section of the cell connector and the at least one opening and the at least one centering unit are oriented with respect to one another such that the connection section is guided into the opening by means of the centering unit.

* * * * *

UNITED STATES PATENT AND TRADEMARK OFFICE
CERTIFICATE OF CORRECTION

| | | |
|---|---|---|
| PATENT NO. | : 12,394,856 B2 | Page 1 of 1 |
| APPLICATION NO. | : 17/726154 | |
| DATED | : August 19, 2025 | |
| INVENTOR(S) | : Andreas Sedlmayr et al. | |

It is certified that error appears in the above-identified patent and that said Letters Patent is hereby corrected as shown below:

In the Claims

Column 10, Line 38, Claim 19, after "be" delete "pushed"

Signed and Sealed this
Fourteenth Day of October, 2025

John A. Squires
*Director of the United States Patent and Trademark Office*